(12) United States Patent
Jeong et al.

(10) Patent No.: US 8,259,921 B2
(45) Date of Patent: Sep. 4, 2012

(54) METHOD OF VOIP NUMBER PORTABILITY USING WIRELESS DEVICE

(75) Inventors: Young Sic Jeong, Daejeon (KR); Chang Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 967 days.

(21) Appl. No.: 12/254,927

(22) Filed: Oct. 21, 2008

(65) Prior Publication Data

US 2009/0252152 A1 Oct. 8, 2009

(30) Foreign Application Priority Data

Apr. 3, 2008 (KR) .......................... 10-2008-0031282

(51) Int. Cl.
*H04M 7/00* (2006.01)
(52) U.S. Cl. .................................. 379/221.13; 455/414.1
(58) Field of Classification Search ............. 379/221.13; 455/414.1
See application file for complete search history.

(56) References Cited

U.S. PATENT DOCUMENTS

| 5,867,570 | A | * | 2/1999 | Bargout et al. | .......... 379/221.13 |
| 6,795,444 | B1 | * | 9/2004 | Vo et al. | ......................... 370/401 |
| 6,882,721 | B2 | | 4/2005 | Mikhailov et al. | |
| 2004/0242243 | A1 | * | 12/2004 | Luis | ............................. 455/461 |

* cited by examiner

*Primary Examiner* — Quynh Nguyen
(74) *Attorney, Agent, or Firm* — Staas & Halsey LLP

(57) ABSTRACT

A method of processing a number portability call, the method including: transmitting a call request message to a donor network server based on dialed number information of a called terminal; receiving a response message according to number portability of the called terminal from the donor network server, in correspondence to the call request message; detecting routing number information of the called terminal based on the dialed number information, according to reception of the response message; and performing call setup to a recipient network server associated with the called terminal based on at least one of the dialed number information and the routing number information is provided.

13 Claims, 14 Drawing Sheets

METHOD OF VOIP NUMBER PORTABILITY USING WIRELESS DEVICE

CROSS-REFERENCE TO RELATED APPLICATION

This application claims the benefit of Korean Patent Application No. 10-2008-0031282, filed on Apr. 3, 2008, in the Korean Intellectual Property Office, the disclosure of which is incorporated herein by reference.

BACKGROUND OF THE INVENTION

1. Field of the Invention

The present invention relates to a method of processing a number portability call, and more particularly, to a call processing method according to a number portability of an Internet phone using a wireless device.

This work was supported by the IT R&D program of MIC/IITA. [2008-PI-32-08K20, A Study on Standardization for Implementation of Number Portability]

2. Description of Related Art

Currently, with the continuous advancement in communication networks, various types of wired/wireless communication networks such as mobile communication networks, wired Voice over Internet Protocol (VoIP) networks, wireless VoIP networks, and the like are being provided in addition to legacy communication networks such as public switched telephone networks (PSTN) and the like. The appearance of diversified communication networks required an interworking scheme for each communication network. In particular, interworking technologies for providing user-tailored services have been developed for users that desire diversified and convenient services.

As communication providers are being diversified along with increase and variety in communication networks, a user generally signs up with a desired site of the communication providers and uses services. Although the user may change the communication provider to another communication provider, the user generally desires to keep using his/her previous telephone number. Accordingly, a number portability service enabling the user to keep using the previous telephone number regardless of whether the communication provider or network is changed is popular.

In order to provide the number portability service, there is a need for development of call processing technology between different communication networks or between communication providers. In particular, the communication provider or network may need to use a different protocol to provide the communication services. Accordingly, there is a need to define a method of processing a number portability call in a situation where different protocols such as No. 7, H.323, session initiation protocol (SIP), and the like are used.

BRIEF SUMMARY

An aspect of the present invention provides a method of processing an Internet phone number portability call that can flexibly determine a call connection message according to an interworking protocol and thereby provide an effective call processing scheme between different communication networks.

Another aspect of the present invention also provides a method of processing a number portability call with respect to a data call and a voice call with any one of communication networks including a Voice over Internet Protocol (VoIP) using a wireless device such as a wireless broadband Internet (WiBro), a wired VoIP, a wired phone, and a mobile phone.

Another aspect of the present invention also provides a method of processing an Internet phone number portability call that can provide various types of interworking schemes such as Query on Release (QoR), Remote Call Forwarding (RCF), All Call Query (ACQ), and the like, and thereby select an optimal interworking scheme according to a communication network state.

According to an aspect of the present invention, there is provided a method of processing a number portability call, the method including: transmitting a call request message to a donor network server based on dialed number information of a called terminal; receiving a response message according to number portability of the called terminal from the donor network server, in correspondence to the call request message; detecting routing number information of the called terminal based on the dialed number information, according to reception of the response message; and performing call setup to a recipient network server associated with the called terminal based on at least one of the dialed number information and the routing number information.

In this instance, the call request message may be an initial address message and the response message may be a call release message. The detecting of the routing number information may include: maintaining a number portability database including routing number information; and detecting, from the number portability database, the routing number information of the called terminal corresponding to the dialed number information, when the called terminal is determined as a terminal using a number portability based on the call release message.

Also, the donor network server or the recipient network server may be a server that is connected by No. 7 protocol. The initial address message or the call release message may be a message that is based on No. 7 protocol. The call release message may be a message in which the donor network server sets at least one of a cause value and a diagnostic value of the call release message according to a number portability of the called terminal. The determination using the call release message may determine whether the called terminal is the terminal using the number portability based on at least one of the cause value and the diagnostic value of the call release message.

Also, the call request message may be a LocationRequest message, and the response message may be a LocationReject message. The detecting of the routing number information may include: maintaining a number portability database including the routing number information; and detecting, from the number portability database, the routing number information of the called terminal corresponding to the dialed number information, when the called terminal is determined as a terminal using a number portability based on the LocationReject message.

Also, the call request message may be an invite message. The detecting of the routing number information may include: maintaining a number portability database including routing number information; and detecting, from the number portability database, routing number information of the called terminal corresponding to the dial number information when the called terminal is determined as a terminal using a number portability based on the response message.

According to another aspect of the present invention, there is provided a method of processing a number portability call, the method including: receiving, from an originating network server, a call request message including dialed number information of a called terminal; setting a response message according to a number portability of the called terminal, when the called terminal is determined as a terminal using a number portability based on the dialed number information; and transmitting the response message to the originating network server.

According to still another aspect of the present invention, there is provided a method of processing a number portability call, the method including: receiving, from an originating network server, a call request message including dialed number information of a called terminal; detecting parametric number information associated with the dialed number information, when the called terminal is determined as a terminal using a number portability based on the dialed number information; transmitting the call request message to a recipient network server associated with the called terminal, based on the parametric number information; and performing call setup between the originating network server and the recipient network server according to transmission/reception of a message corresponding to transmission of the call request message.

According to yet another aspect of the present invention, there is provided a method of processing a number portability call, the method including: receiving, from a calling terminal, dialed number information associated with a donor network of a called terminal; detecting, from a number portability database, routing number information of the called terminal based on the dialed number information; transmitting a call request message to a recipient network server associated with the called terminal based on at least one of the dialed number information and the routing number information; and performing call setup to the recipient network server according to transmission/reception of a message corresponding to transmission of the call request message.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
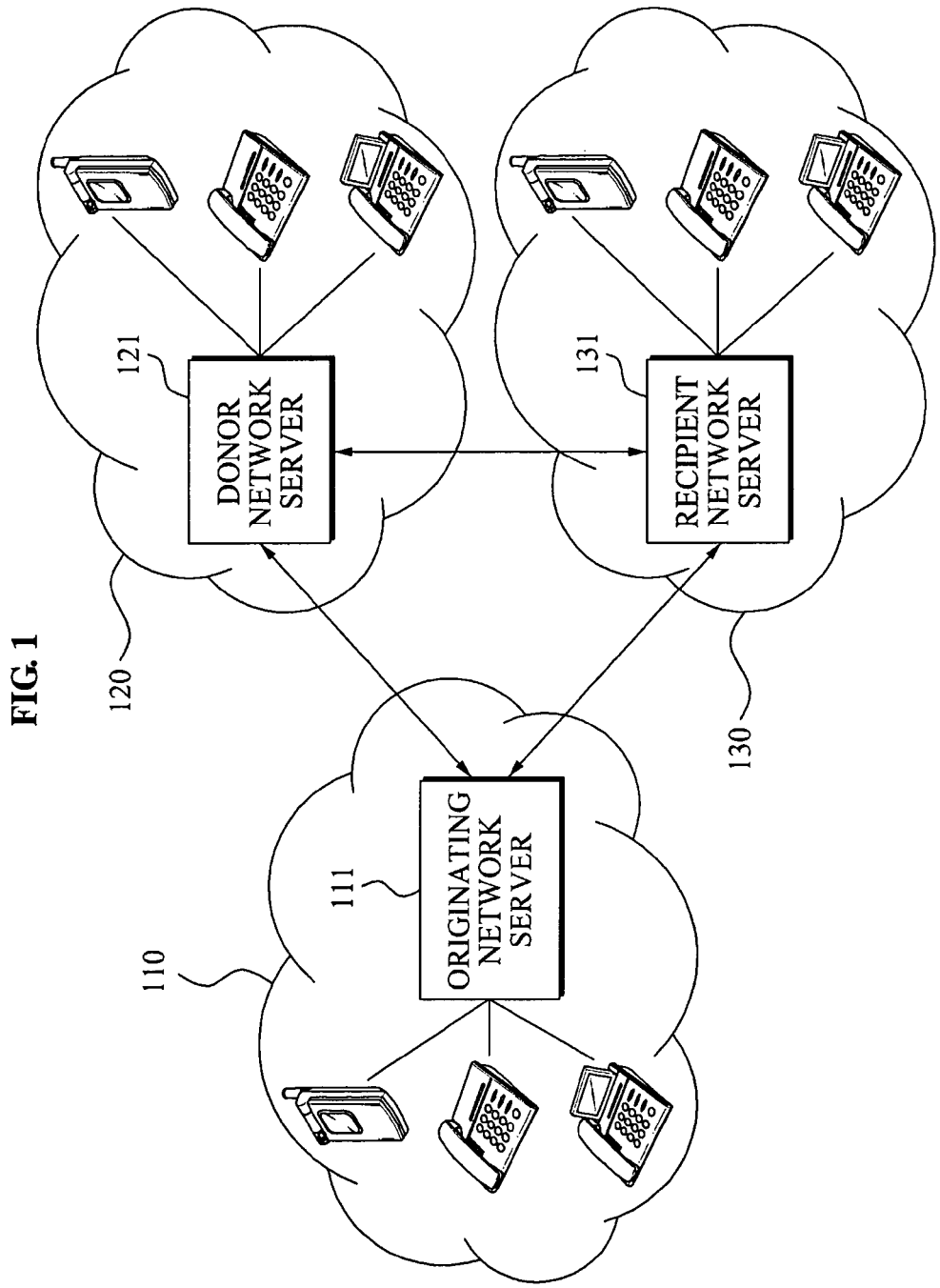
FIG. 1 is a schematic diagram illustrating a method of processing a number portability call according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a schematic diagram illustrating a method of processing a number portability call according to an embodiment of the present invention.

Referring to FIG. 1, an originating network server 111 included in an originating network 110 may transmit a call request message to a donor network server 121 included in an originating network 120, in correspondence to a call request from a calling terminal to a called terminal. When the called terminal included in the donor network 120 belongs to a recipient network 130 due to a number portability, the originating network server 111 may perform call connection to a recipient network server 131 included in the recipient network 130.

The originating network server 111, the donor network server 121, or the recipient network server 131 may be a call processing device in a communication network that the originating network server 111, the donor network server 121, or the recipient network server 131 belongs to. For example, any one of the originating network server 111, the donor network server 121, or the recipient network server 131 may be an electronic communication network system, a switchboard, or a soft switch. Also, according to an aspect, the originating network server 111 or the donor network server 121 may be a number portability call processing device that performs a method of processing a number portability call. Also, any one of the originating network 110, the donor network 120, and the recipient network 130 may be any one of a Voice over Internet Protocol (VoIP) network using a wireless device such as wireless broadband (WiBro) and the like, a wired VoIP network, a wired phone network, and a mobile phone network. Also, a method of processing number portability call according to an aspect of the present invention may be a method of processing a number portability call between VoIP networks using a wireless device such as WiBro and the like, between the VoIP network using the wireless device and a wired VoIP network, between the VoIP network using the wireless device and a wired phone network, or between the VoIP network using the wireless device and a mobile phone network.

According to an aspect of the present invention, the originating network server 111, the donor network server 121, or the recipient network server 131 may be connected by any one of No. 7 protocol, H.323 protocol, and session initiation protocol (SIP). The method of processing the number portability call may be performed according to any one of a Query on Release (QoR) scheme, a Remote Call Forwarding (RCF) scheme, and an All Call Query (ACQ) scheme. Hereinafter, the method of processing the number portability call between communication networks that are connected by any one of the No. 7 protocol, the H.323 protocol, and the SIP protocol, according to any one of the QoR scheme, the RCF scheme, and the ACQ scheme will be further described in detail.

Figure 2:
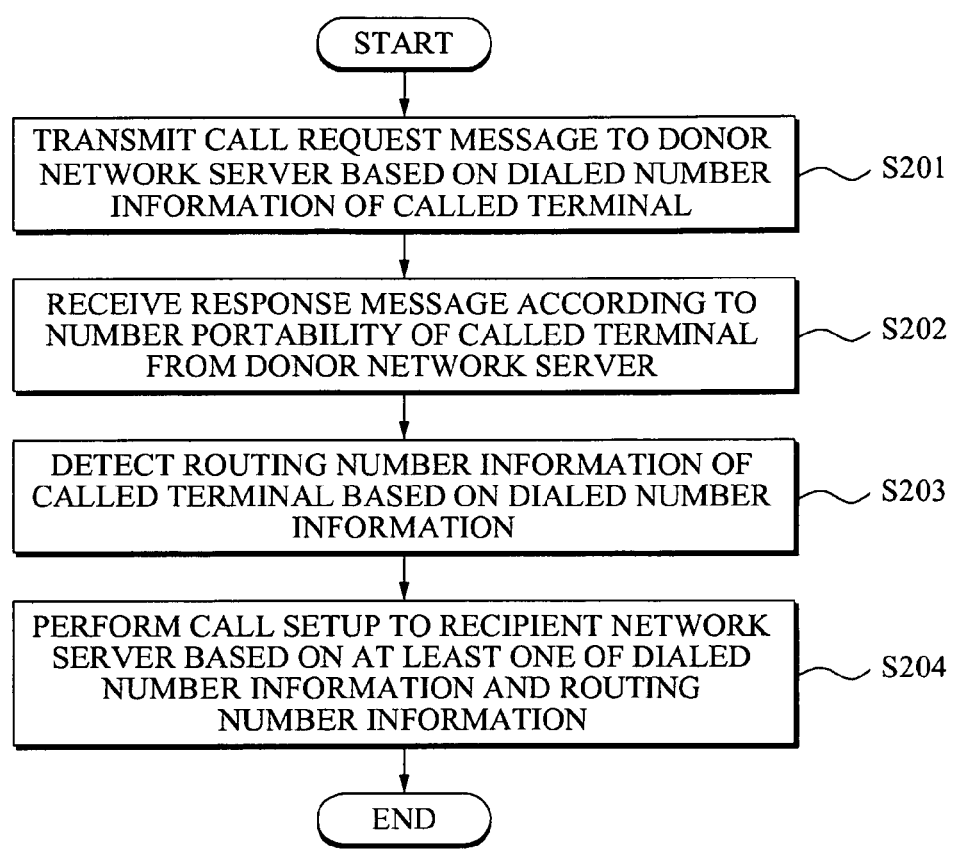
FIG. 2 is a flowchart illustrating a method of processing a number portability call according to an embodiment of the present invention.

FIG. 2 is a flowchart illustrating a method of processing a number portability call according to an embodiment of the present invention. FIG. 3 illustrates an example of a number portability call process according to a QoR scheme.

As shown in FIG. 2, the method of processing the number portability call (hereinafter, referred to as "call processing method") may be performed through operations S201 to S204. The call processing method may be performed by an apparatus for processing a number portability call (hereinafter, referred to as "call processing apparatus"). The call processing method performed through operations S201 to S204 may be an example of processing the number portability call according to the QoR scheme.

In operation S201, the call processing apparatus may transmit a call request message to a donor network server based on dialed number information of a called terminal.

In operation S202, the call processing apparatus may receive a response message according to the number portability of the called terminal from the donor network server, in correspondence to the call request message.

In operation S203, the call processing apparatus may detect routing number information of the called terminal based on the dialed number information, according to reception of the response message.

In operation S204, the call processing apparatus may perform call setup to a recipient network server associated with the called terminal based on at least one of the dialed number information and the routing number information.

Also, operations S201 through S204 may be performed differently depending on a connection protocol between the call processing apparatus and the donor network server or the recipient network server. The connection protocol may be any one of, for example, No. 7 protocol, H.323 protocol, and SIP. Hereinafter, each embodiment regarding a method of processing a number portability call in the interworking state to any one of No. 7 protocol, H.323 protocol, and SIP when the call processing apparatus performs the call processing method according to the QoR scheme will be described.

Figure 3A:
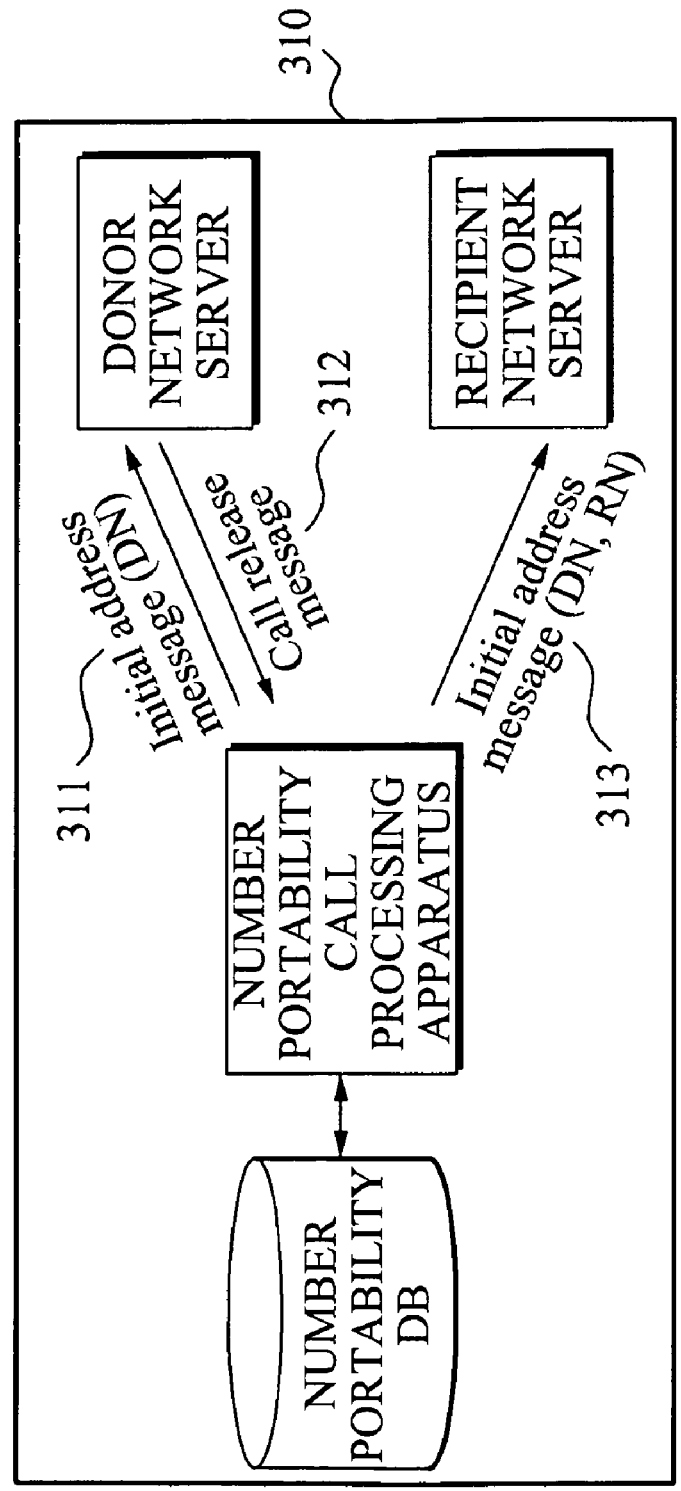
FIGS. 3A through 3C illustrate an example of number portability call process according to a Query on Release (QoR) scheme.

According to an aspect of the present invention, referring to FIG. 2 and a call processing example 310 of FIG. 3A, the call processing apparatus may transmit an initial address message 311 to a donor network server based on dialed number information of a called terminal in operation S201. The initial address message 311 may include the dialed number information. "DN" shown in FIG. 3 may denote the dialed number information. Also, the donor network server may be a server that is connected by No. 7 protocol. The initial address message 311 or a call release message 312 may be a message that is based on No. 7 protocol.

In operation S202, the call processing apparatus may receive the call release message 312 according to the number portability of the called terminal from the donor network server, in correspondence to the initial address message 311. In this instance, the call release message 312 may be a message in which the donor network server sets at least one of a cause value and a diagnostic value of the call release message 312 according to a number portability of the called terminal. Specifically, the donor network sever may determine whether the called terminal is a terminal using a number portability based on the dialed number information. When the called terminal is determined as a user using the number portability, the donor network server may transmit a call release message corresponding to one of integrated service digital network user part (ISUP) messages and may determine at least one of the internal cause value and the diagnostic value of the call release message according to the number portability. For example, the donor network server may set the cause value to number portability, for example, 0000 1110 and may also set the diagnostic value to inter-network portability or provider portability, for example, 0000 0010. Also, the donor network server may maintain and use a predetermined database containing number portability information in order to determine whether the called terminal is the terminal using the number portability.

In operation S203, the call processing apparatus may detect routing number information of the called terminal based on the dialed number information according to reception of the call release message 312. Specifically, the call processing apparatus may maintain a number portability database containing the routing number information. When the called terminal is determined as a terminal using a number portability based on the call release message 312, the call processing apparatus may detect, from the number portability database, the routing number information of the called terminal corresponding to the dialed number information. In this instance, the call processing apparatus may determine whether the called terminal is the terminal using the number portability based on at least one of the internal cause value and the diagnostic value of the call release message 312. For example, when the cause value is set to the number portability, or when the diagnostic value is set to the inter-network portability or to the provider portability, the call processing apparatus may determine the called terminal as the terminal using the number portability.

In operation S204, the call processing apparatus may perform call setup to the recipient network server associated with the called terminal based on at least one of the dialed number information and the routing number information. Specifically, the call processing apparatus may transmit an initial address message 313 including the dialed number information or the routing number information to the recipient network server and perform call setup to the recipient network server according to transmission/reception of a message corresponding to the transmitted initial address message 313. Also, the recipient network server may be a server that is connected by No. 7 protocol. The initial address message 313 may be a message that is based on No. 7 protocol. "RN" shown in FIG. 3 may denote the routing number information.

The call processing example 310 may be an example of processing a number portability call between a VoIP network using a wireless device such as WiBro and the like, and a mobile phone network. In the call processing example 310, the number portability call processing apparatus may be a call processing apparatus in the VoIP network using the wireless device such as WiBro, a wired VoIP network, a wired phone network, or a mobile phone network. A donor network may be the VoIP network using the wireless device, or the mobile phone network. A recipient network may be the VoIP network using the wireless device, or the mobile phone network. The initial address message 311 or 313 may be, for example, Initial Address Message (IAM). The call release message may be, for example, a RELease (REL) message. Also, any one of the call processing apparatus, the donor network server, and the recipient network server may be an electronic communication network system, a switchboard, or a soft switch.

Figure 3B:
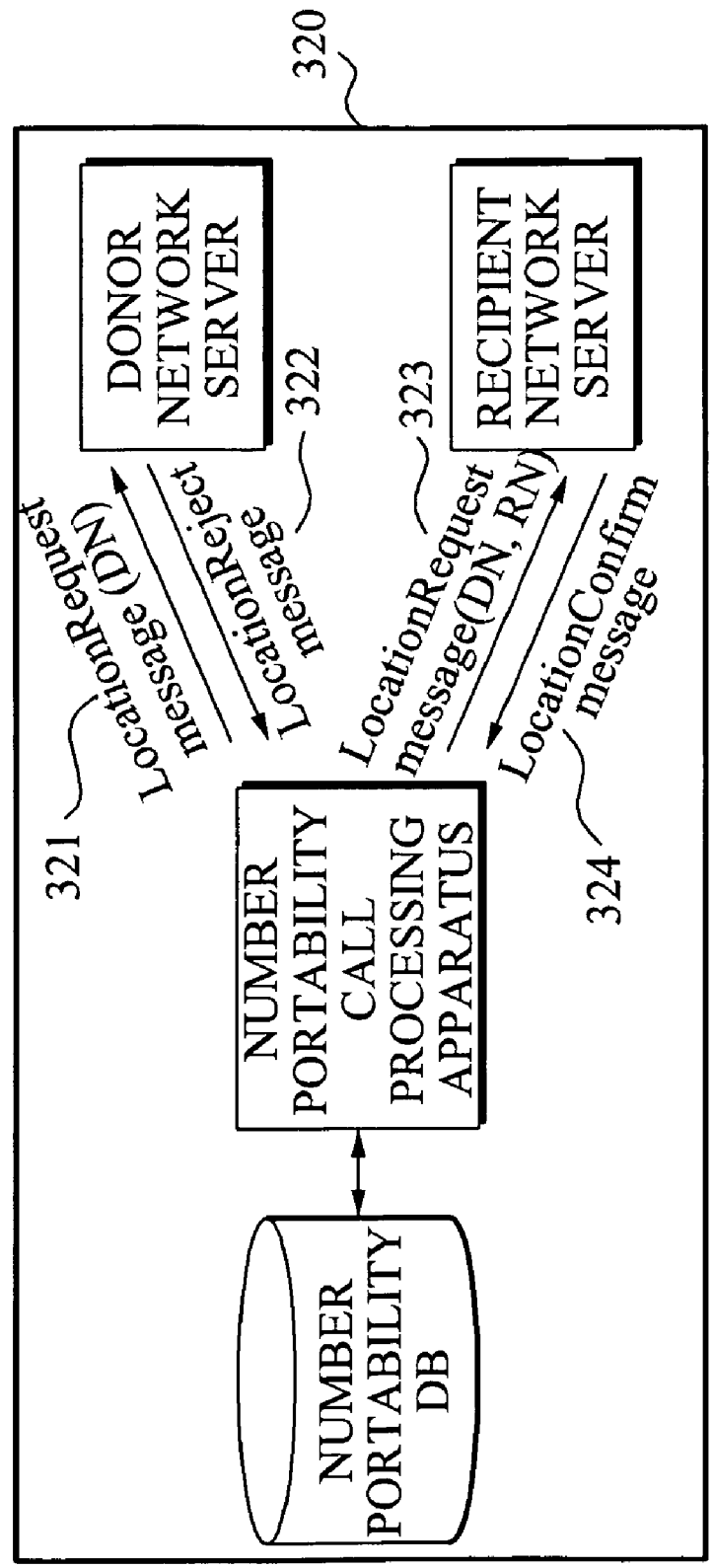

According to another aspect of the present invention, referring to FIG. 2 and a call processing example 320 of FIG. 3B, the call processing apparatus may transmit a LocationRequest message 321 to a donor network server based on dialed number information of a called terminal in operation S201. The LocationRequest message 321 may include the dialed number information. "DN" shown in FIG. 3 may denote the dialed number information. Also, the donor network server may be a server that is connected by H.323 protocol. The LocationRequest message 321 or a LocationReject message 322 may be a message that is based on H.323 protocol.

In operation S202, the call processing apparatus may receive the LocationReject message 322 according to number portability of the called terminal from the donor network server in correspondence to the LocationRequest message 321. The LocationReject message 322 may be a message in which the donor network server sets at least one of a LocationRejectReason field and a nonStandardData field of the LocationReject message 322 according to a number portability of the called terminal. Specifically, the donor network server may determine whether the called terminal is a terminal using a number portability based on the dialed number information. When the called terminal is determined as a user using the number portability, the donor network server may transmit the LocationReject message 322 and determine at least one of the LocationRejectReason field and the nonStandardData field according to the number portability. For example, the donor network server may set the LocationRejectReason field to, for example, RequestDenied and set the nonStandardData field to, for example, Np_Ported_Out. Also, the donor network server may maintain and use a predetermined database including number portability information in order to determine whether the called terminal is the terminal using the number portability.

In operation S203, the call processing apparatus may detect routing number information of the called terminal based on the dialed number information according to reception of the LocationReject message 322. Specifically, the call processing apparatus may maintain a number portability database including the routing number information. When the called terminal is determined as a terminal using a number portability based on the LocationReject message 322, the call processing apparatus may detect, from the number portability database, routing number information of the called terminal corresponding to the dialed number information. In this instance, the call processing apparatus may determine whether the called terminal is the terminal using the number portability based on at least one of the LocationRejectReason field and the nonStandardData field. For example, when the LocationRejectReason field is set to RequestDenied, or when the nonStandardData field is set to Ported_Out, the call processing apparatus may determine the called terminal as the terminal using the number portability.

In operation S204, the call processing apparatus may perform call setup to a recipient network server associated with the called terminal based on at least one of the dialed number information and the routing number information. Specifically, the call processing apparatus may transmit a LocationRequest message 323 including the dialed number information or the routing number information to the recipient network server, and perform call setup to the recipient network server when a LocationConfirm message 324 corresponding to the transmitted LocationRequest message 323 is received from the recipient network server. Also, the recipient network server may be a server that is connected by H.323 protocol. The LocationRequest message 323 and the LocationConfirm message 324 may be a message that is based on H.323 protocol. Also, "RN" shown in FIG. 3 may denote the routing number information.

The call processing example 320 may be an example of processing a number portability call between a VoIP network using a wireless device such as WiBro and the like, and any one of the VoIP network using the wireless device, a wired VoIP network, a wired phone network, and a mobile phone network. In the call processing example 320, the number portability call processing apparatus may be a call processing apparatus in the VoIP network using the wireless device, the wired VoIP network, the wired phone network, or the mobile phone network. A donor network may be the VoIP network using the wireless device, the wired VoIP network, or the wired phone network. A recipient network may be the VoIP network using the wireless device, the wired VoIP network, the wired phone network, or the mobile phone network. The LocationRequest message 311 or 313 may be, for example, LocationRequest. The LocationReject message 322 may be, for example, LocationReject. The LocationConfirm message 324 may be, for example, LocationConfirm. Also, any one of the call processing apparatus, the donor network server, and the recipient network server may be an electronic communication network system, a switchboard, or a soft switch.

Figure 3C:
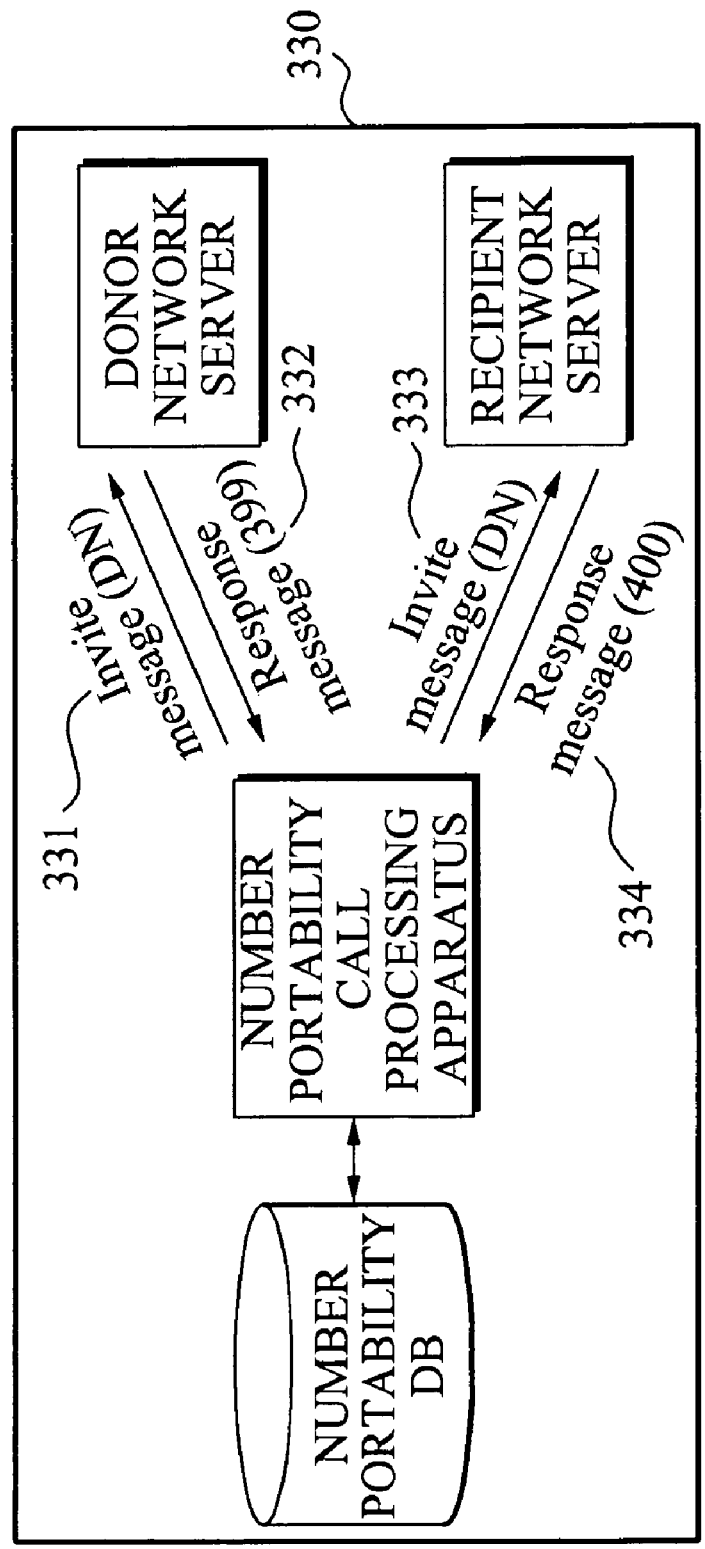

According to still another aspect of the present invention, referring to FIG. 2 and a call processing example 330 of FIG. 3C, the call processing apparatus may transmit an invite message 331 to a donor network server based on dialed number information of a called terminal. The invite message 331 may include the dialed number information. "DN" shown in FIG. 3 may indicate the dialed number information. The donor network server may be a server that is connected by SIP. The invite message 331 or a response message 332 may be a message that is based on SIP.

In operation S202, the call processing apparatus may receive the response message 332 according to number portability of the called terminal from the donor network server in correspondence to the invite message 331. In this instance, the response message 332 may be message in which a status code value is set according to the number portability of the called terminal. Specifically, the donor network server may determine whether the called terminal is a terminal using the number portability based on the dialed number information. When the called terminal is determined as a user using the number portability, the donor network server may transmit the response message 332 and determine the status code value of the response message 332 according to the number portability. For example, the donor network server may set the status code value to 399. Also, the donor network server may maintain and use a predetermined database including number portability information in order to determine whether the called terminal is the terminal using the number portability.

In operation S203, the call processing apparatus may detect routing number information of the called terminal based on the dialed number information according to reception of the response message 332. Specifically, the call processing apparatus may maintain a number portability database including the routing number information. When the called terminal is determined as the terminal using the number portability based on the response message 322, the call processing apparatus may detect, from the number portability database, the routing number information of the called terminal corresponding to the dialed number information. In this instance, the call processing apparatus may determine whether the called terminal is the terminal using the number portability based on the status code value of the response message 332. For example, when the status code value of the response message 332 is set to 399, the call processing apparatus may determine the called terminal as the terminal using the number portability.

In operation S204, the call processing apparatus may perform call setup to a recipient network server associated with the called terminal based on at least one of the dialed number information and the routing number information. Specifically, the call processing apparatus may transmit an invite message 333 including the dialed number information or the routing number information, and perform call setup to the recipient network server when a response message 334 corresponding to the invite message 333 is received from the recipient network server. The status code value of the response message 334 may be set to 200. The recipient network server may be a server that is connected by SIP. The invite message 333 and the response message 334 may be a message that is based on SIP. Also, "RN" shown in FIG. 3 may denote the routing number information.

The call processing example 330 may be an example of processing a number portability call between a VoIP network using a wireless device such as WiBro and the like, and any one of the VoIP network using the wireless device, a wired VoIP network, a wired phone network, and a mobile phone network. In the call processing example 330, the number portability call processing apparatus may be a call processing apparatus in the VoIP network using the wireless device, the wired VoIP network, the wired phone network, or the mobile phone network. A donor network may be the VoIP network using the wireless device, the wired VoIP network, or the wired phone network. A recipient network may be the VoIP network using the wireless device, the wired VoIP network, or the wired phone network. Also, any one of the call processing apparatus, the donor network server, and the recipient network server may be an electronic communication network system, a switchboard, or a soft switch.

Figure 4:
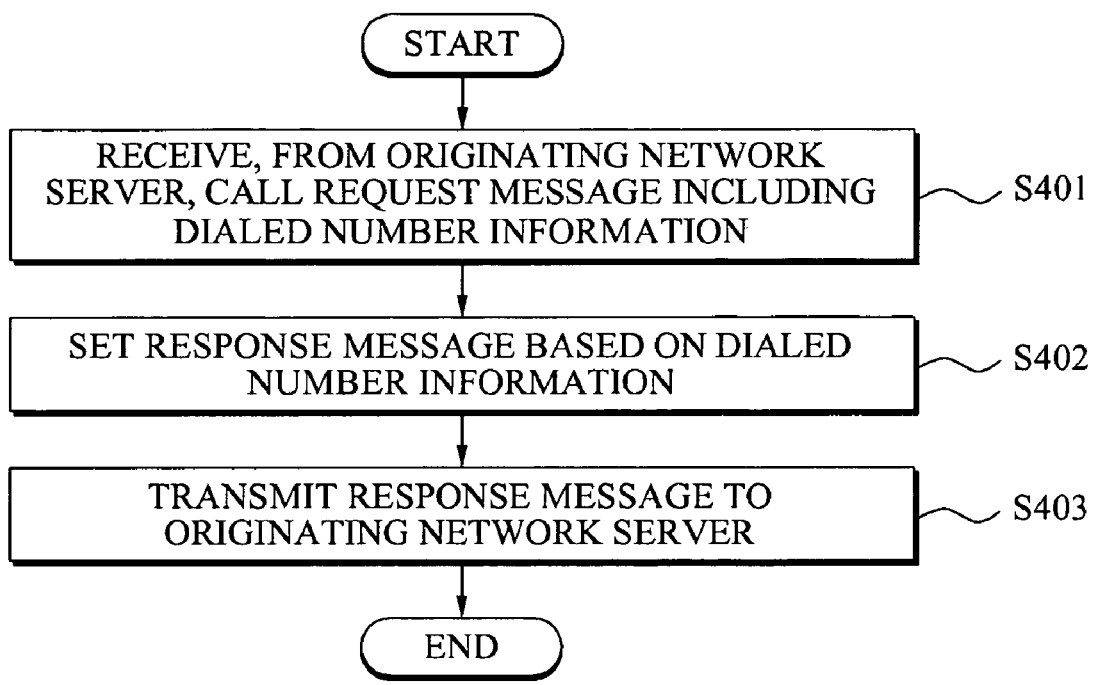
FIG. 4 is a flowchart illustrating a method of processing a number portability call according to another embodiment of the present invention.

FIG. 4 is a flowchart illustrating a method of processing a number portability call according to another embodiment of the present invention.

As shown in FIG. 4, the call processing method may be performed through operations S401 to S403. The call processing method may be performed by a processing apparatus. The call processing apparatus of FIG. 4 may correspond to the donor network server described above with reference to FIGS. 2 and 3. The call processing method may have been performed in an aspect of the above-described donor network server.

In operation S401, the call processing apparatus may receive, from an originating network server, a call request message including dialed number information of a called terminal.

In operation S402, when the called terminal is determined as a terminal using a number portability based on the dialed number information, the call processing apparatus may set a response message according to number portability of the called terminal.

In operation S402, the call processing apparatus may transmit the response message to the originating network server. In this instance, the originating network server may detect routing number information of the called terminal based on the dialed number information according to reception of the response message. Also, the call processing apparatus may perform call setup to a recipient network server associated with the called terminal based on at least one of the dialed number information and the routing number information.

In the case of detecting the routing number information of the called terminal based on the dialed number information according to reception of the response message, the originating network server may detect, from a number portability database, the routing number information of the called terminal corresponding to the dialed number information when the called terminal is determined as the terminal using the number portability based on the response message. The originating network server may be a server that is connected by any one of No. 7 protocol, H.323 protocol, and SIP. The recipient network server may be a server that is connected by any one of No. 7 protocol, H.323 protocol, and SIP. The call request message or the response message may be a message that is based on any one of No. 7 protocol, H.323 protocol, and SIP.

According to an aspect of the present invention, the originating network server may be the call processing apparatus shown in the call processing example 310 of FIG. 3A. The call processing apparatus performing the call processing method of FIG. 4 may be the donor network server of FIG. 3A. Also, according to another aspect of the present invention, the originating network server may be the call processing apparatus shown in the call processing example 320 of FIG. 3B. The call processing apparatus performing the call processing method of FIG. 4 may be the donor network server of FIG. 3B. Also, according to still another aspect of the present invention, the originating network server may be the call processing apparatus shown in the call processing apparatus 330 of FIG. 3C. The call processing apparatus performing the call processing method of FIG. 4 may be the donor network server of FIG. 3C. Specifically, when performing the call processing method according to the QoR scheme, the call processing apparatus corresponding to the donor network server described above with reference to FIGS. 2 and 3 may perform the call processing method in the interworking state to any one of No. 7 protocol, No. 323 protocol, and SIP.

Matters not described with reference to operations S401 through S403 may be the same as descriptions made with reference to FIGS. 2 and 3, or may be readily deduced therefrom. Therefore, further detailed descriptions related thereto will be omitted here. The call processing apparatus of FIG. 4 may correspond to the donor network server of FIG. 2 or FIG. 3. The originating network server of FIG. 4 may correspond to the call processing apparatus of FIG. 2 or FIG. 3.

Figure 5:
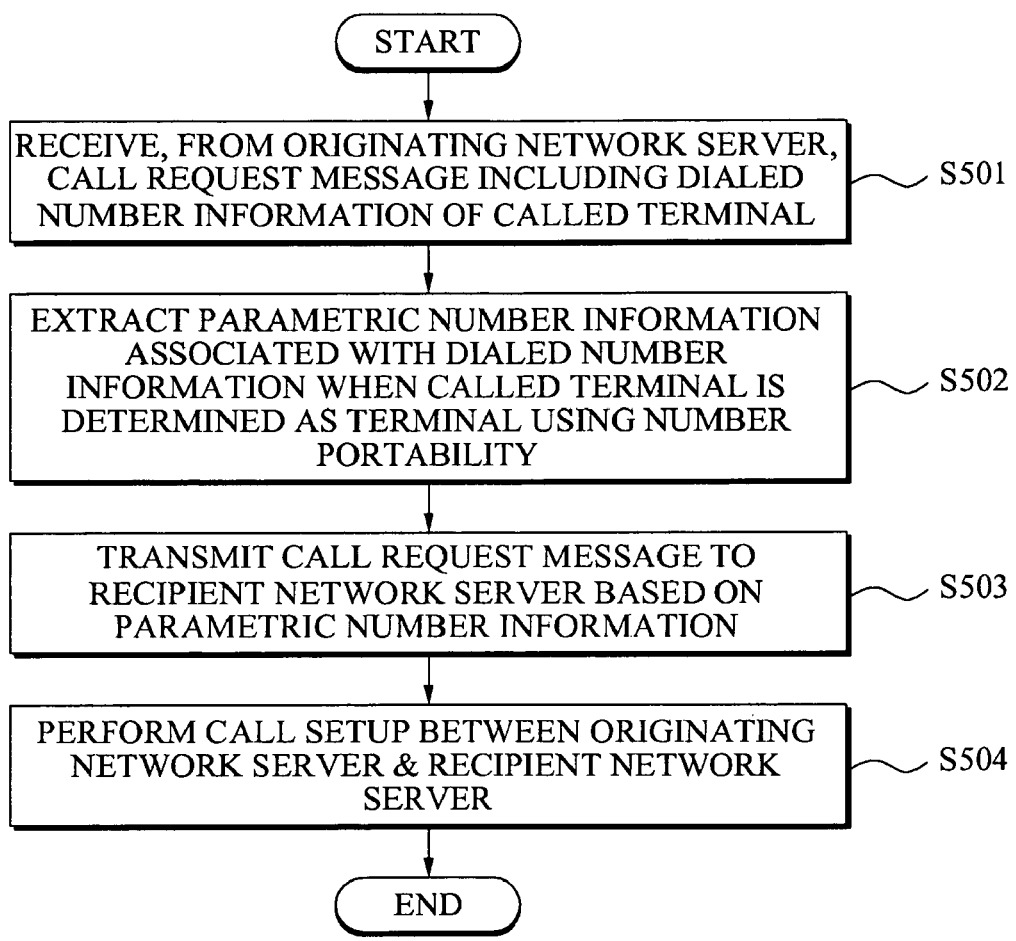
FIG. 5 is a flowchart illustrating a method of processing a number portability call according to still another embodiment of the present invention.

FIG. 5 is a flowchart illustrating a method of processing a number portability call according to still another embodiment of the present invention. FIG. 6 illustrates an example of a number portability call process according to an RCF scheme.

As shown in FIG. 5, the call processing method may be performed through operations S501 to S504. Also, the call processing method may be performed by a call processing apparatus. The call processing method performed through operations S501 to S504 may be an example of processing the number portability call according to the RCF scheme.

In operation S501, the call processing apparatus may receive, from an originating network server, a call request message including dialed number information of a called terminal.

In operation S502, when the called terminal is determined as a terminal using a number portability based on the dialed number information, the call processing apparatus may detect parametric number information associated with the dialed number information.

In operation S503, the call processing apparatus may transmit the call request message to a recipient network server associated with the called terminal, based on the parametric number information.

In operation S504, the call processing apparatus may perform call setup between the originating network server and the recipient network server according to transmission/reception of a message corresponding to transmitting of the call request message.

Also, operations S501 through S504 may be performed differently depending on a connection protocol between the call processing apparatus and the originating network server or the recipient network server. The connection protocol may be any one of, for example, No. 7 protocol, H.323 protocol, and SIP. Hereinafter, each embodiment regarding a method of processing a number portability call in the interworking state to any one of No. 7 protocol, H.323 protocol, and SIP when the call processing apparatus performs the call processing method according to the RCF scheme will be described.

Figure 6A:
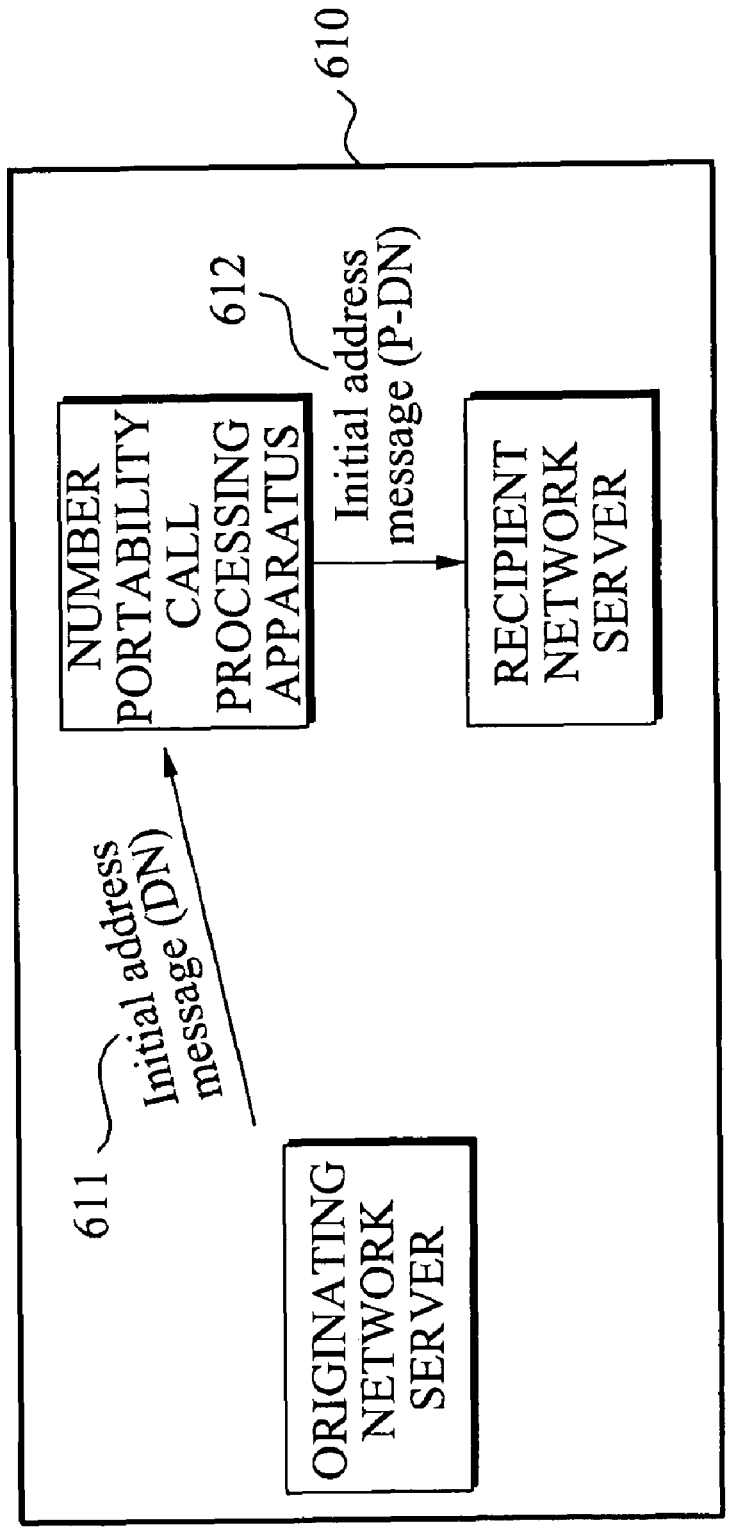
FIGS. 6A through 6C illustrate an example of a number portability call process according to a Remote Call Forwarding (RCF) scheme.

According to an aspect of the present invention, referring to FIG. 5 and a call processing example 610 of FIG. 6A, the call processing apparatus may receive, from an originating network server, an initial address message 611 including dialed number information of a called terminal. In this instance, the initial address message 611 may include the dialed number information. "DN" shown in FIG. 6A may denote the dialed number information. Also, the originating network server may be a server that is connected by No. 7 protocol. The initial address message 611 may be a message that is based on No. 7 protocol.

In operation S502, when the called terminal is determined as a terminal using a number portability based on the dialed number information, the call processing apparatus may detect parametric number information associated with the dialed number information. The call processing apparatus may maintain and use a predetermined database including information associated with the terminal using the number portability in order to determine whether the called terminal is the terminal using the number portability. For example, the parametric number information may be parametric dialed number information (P-DN).

In operation S503, the call processing apparatus may transmit an initial address message 612 to a recipient network server associated with the called terminal based on the parametric number information. Specifically, the call processing apparatus may route a phone call to the recipient network server using the parametric number information that is detected based on the dialed number information included in the initial address message 611. "P-DN" shown in FIG. 6 may be parametric number information. Also, the recipient network server may be a server that is connected by No. 7 protocol. The initial address message 612 may be a message that is based on No. 7 protocol.

In operation S504, the call processing apparatus may perform call setup between the originating network server and the recipient network server according to transmission/reception of a message corresponding to transmission of the initial address message 612.

The call processing example 610 may be an example of processing a number portability call between a VoIP network using a wireless device such as WiBro and the like, and a mobile phone network. In the call processing example 610, the number portability call processing apparatus may be a call processing apparatus in the VoIP network using the wireless device, a wired VoIP network, or the mobile phone network. A donor network may be the VoIP network using the wireless device, or the mobile phone network. A recipient network may be the VoIP network using the wireless device, or the mobile phone network. Also, the initial address message 611 or 612 may be, for example, IAM. Also, any one of the originating network server, the call processing apparatus, and the recipient network server may be an electronic communication network system, a switchboard, or a soft switch.

Figure 6B:
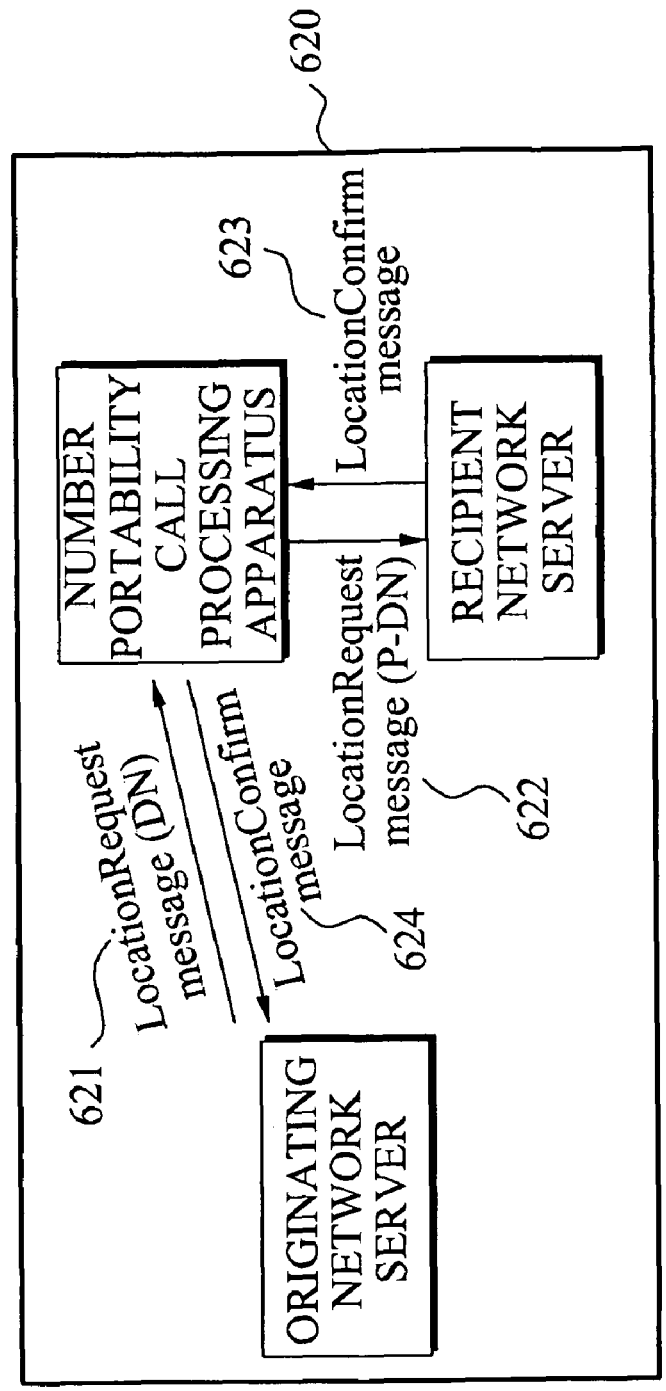

According to another aspect of the present invention, referring to FIG. 5 and a call processing example 620 of FIG. 6B, the call processing apparatus may receive, from an originating network server, a LocationRequest message 621 including dialed number information of a called terminal. The LocationRequest message 621 may include the dialed number information. "DN" shown in FIG. 6 may denote the dialed number information. Also, the originating network server may be a server that is connected by H.323 protocol. The LocationRequest message 621 may be a message that is based on H.323 protocol.

In operation S502, when the called terminal is determined as a terminal using a number portability based on the dialed number information, the call processing apparatus may detect parametric number information associated with the dialed number information. The call processing apparatus may maintain and use a predetermined database including information associated with the terminal using the number portability for the determination using the dialed number information. For example, the dialed number information may be P-DN information.

In operation S503, the call processing apparatus may transmit a LocationRequest message 622 to a recipient network server associated with the called terminal based on the parametric number information. Specifically, the call processing apparatus may route a phone call to the recipient network server based on the parametric number information that is detected based on the dialed number information included in the LocationRequest message 621. Also, "P-DN" shown in FIG. 6 may denote the parametric number information. Also, the recipient network server may be a server that is connected by H.323 protocol. The LocationRequest message 622 may be a message that is based on H.323 protocol.

In operation S504, the call processing apparatus may perform call setup between the originating network server and the recipient network server according to transmission/reception of a message corresponding to transmission of the LocationRequest message 622.

Specifically, when a LocationConfirm message 623 is received from the recipient network server in correspondence to the LocationRequest message 622, the call processing apparatus may perform call setup with the recipient network server using the parametric number information. When the LocationConfirm message 623 received from the recipient network server is transmitted to the originating network server, the call processing apparatus may perform call setup with the originating server using the dialed number information. Also, the call processing apparatus may perform call setup between the originating network server and the recipient network server based on the call setup using the parametric number information and the call setup using the dialed number information.

The call processing example 620 may be an example of processing a number portability call between a VoIP network using a wireless device such as WiBro and the like, and any one of the VoIP network using the wireless device, a wired VoIP network, a wired phone network, and a mobile phone network. In the call processing example 620, the originating network server may be a call processing apparatus in the VoIP network using the wireless device, the wired VoIP network, the wired phone network, or the mobile phone network. A donor network may be the VoIP network using the wireless device, the wired VoIP network, or the wired phone network. A recipient network may be the VoIP network using the wireless device, the wired VoIP network, or the wired phone network. The LocationRequest message 621 or 622 may be, for example, LocationReject. The LocationConfirm message 623 or 624 may be, for example, LocationConfirm. Also, any one of the originating network server, the call processing apparatus, and the recipient network server may be an electronic communication network system, a switchboard, or a soft switch.

Figure 6C:
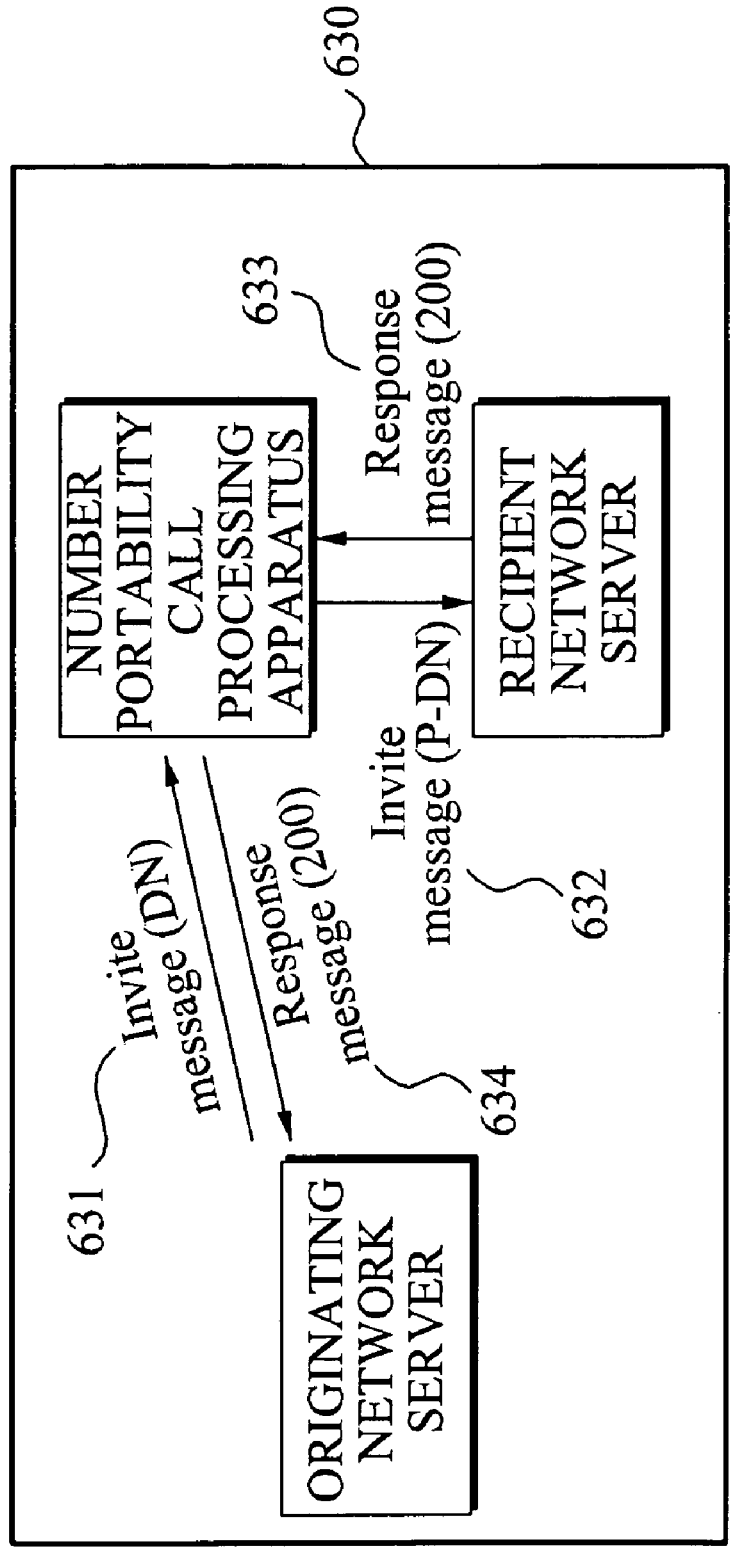

According to still another aspect of the present invention, referring to FIG. 5 and a call processing example 630 of FIG. 6C, the call processing apparatus may receive, from an originating network server, an invite message 631 including dialed number information of a called terminal. The invite message 631 may include the dialed number information. "DN" shown in FIG. 6 may denote the dialed number information. Also, the originating network server may be a server that is connected by SIP. The invite message 631 may be a message that is based on SIP.

In operation S502, when the called terminal is determined as a terminal using a number portability based on the dialed number information, the call processing apparatus may detect parametric number information associated with the dialed number information. The call processing apparatus may maintain and use a predetermined database including information associated with the terminal using the number portability for determination using the dialed number information. For example, the parametric number information may be P-DN.

In operation S503, the call processing apparatus may transmit an invite message 632 to a recipient network server associated with the called terminal based on the parametric number information. Specifically, the call processing apparatus may route a phone call to the recipient network server using the parametric number information that is detected based on the dialed number information included in the invite message 631. "P-DN" shown in FIG. 6 may denote the parametric number information. The recipient network server may be a server that is connected by SIP and the invite message 632 may be a message that is based on SIP.

Also, the call processing apparatus may include number portability information in a diversion field of the invite message 631 and transmit the invited message 632 containing the number portability information to the recipient network server associated with the called terminal based on the parametric number information. Also, the recipient network server may identify the originating network server and the call processing apparatus based on the number portability information. The diversion field included in the number portability may be readily applicable while providing additional services and performing a payment.

In operation S504, the call processing apparatus may perform call setup between the originating network server and the recipient network server according to transmission/reception of a message corresponding to transmission of the invite message 632. Specifically, when a response message 633 is received from the recipient network server in correspondence to the invite message 632 and is transmitted to the originating network server, the call processing apparatus may perform call setup between the originating network server and the recipient network server. A status code value of the response message 633 or 634 may be set to 200.

The call processing example 630 may be an example of processing a number portability call between a VoIP network using a wireless device such as WiBro and the like, and any one of the VoIP network using the wireless device, a wired VoIP network, a wired phone network, and a mobile phone network. In the call processing example 630, the originating network server may be a call processing apparatus in the VoIP network using the wireless device, the wired VoIP network, the wired phone network, or the mobile phone network. A donor network may be the VoIP network using the wireless device, the wired VoIP network, or the wired phone network. A recipient network may be the VoIP network using the wireless device, the wired VoIP network, or the wired phone network. Also, any one of the originating network server, the call processing apparatus, and the recipient network server may be an electronic communication network system, a switchboard, or a soft switch.

Figure 7:
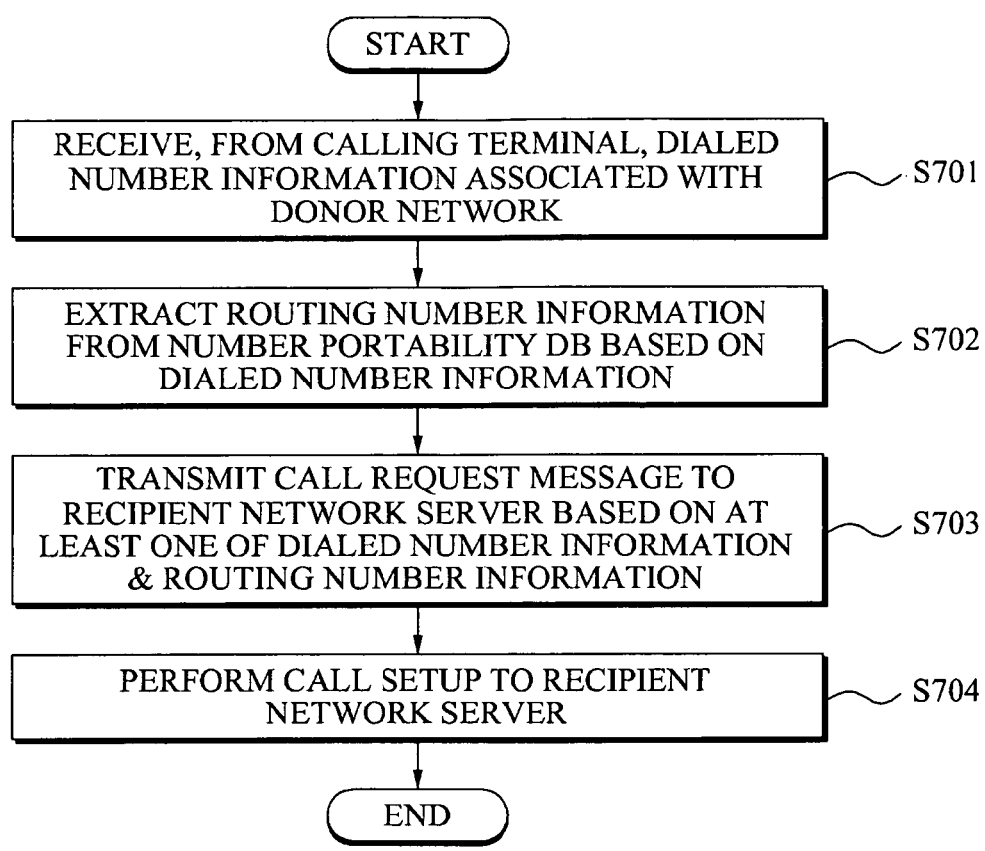
FIG. 7 is a flowchart illustrating a method of processing a number portability call according to yet another embodiment of the present invention.

FIG. 7 is a flowchart illustrating a method of processing a number portability call according to yet another embodiment of the present invention. FIG. 8 illustrates an example of a number portability call process according to an ACQ scheme.

As shown in FIG. 7, the call processing method may be performed through operations S701 to S704. Also, the number portability call processing method may be performed by a call processing apparatus. The call processing method performed through operations S701 to S704 may be an example of processing the number portability call according to the ACQ scheme.

In operation S701, the call processing apparatus may receive, from a calling terminal, dialed number information associated with a donor network of a called terminal.

In operation S702, the call processing apparatus may detect routing number information of the called terminal from a number portability database based on the dialed number information.

In operation S703, the call processing apparatus may transmit a call request message to a recipient network server associated with the called terminal based on at least one of the dialed number information and the routing number information.

In operation S704, the call processing apparatus may perform call setup to the recipient network server according to transmission/reception of a message corresponding to transmission of the call request message.

Also, operations S701 through S704 may be performed differently depending on a connection protocol between the call processing apparatus and the donor network server or the recipient network server. The connection protocol may be any one of, for example, No. 7 protocol, H.323 protocol, and SIP. Hereinafter, each embodiment regarding a method of processing a number portability call in the interworking state to any one of No. 7 protocol, H.323 protocol, and SIP protocol when the call processing apparatus performs the call processing method according to the ACQ scheme will be described.

Figure 8A:
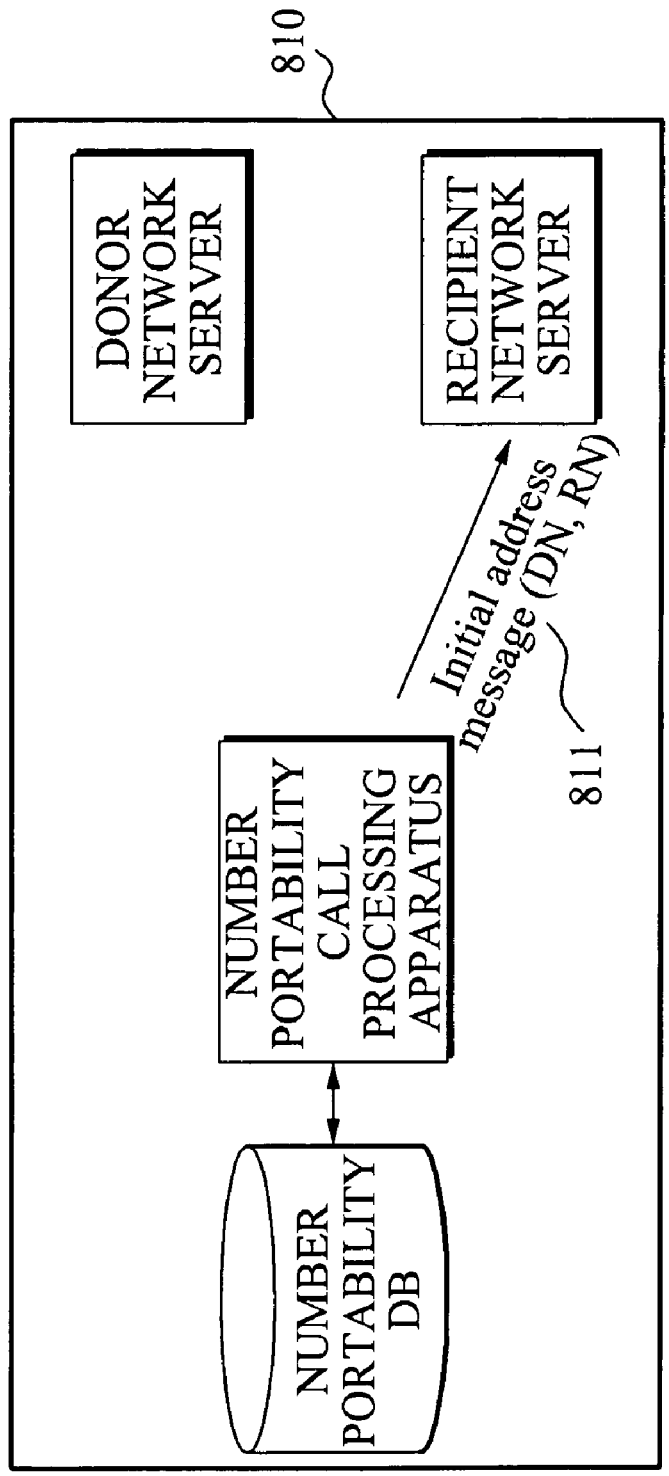
FIGS. 8A through 8C illustrates an example of a number portability call process according to an All Call Query (ACQ) scheme.

According to an aspect of the present invention, referring to FIG. 7 and a call processing example 810 of FIG. 8A, the call processing apparatus may receive, from a calling terminal, dialed number information associated with a donor network of a called terminal in operation S701. The call processing apparatus may receive, from the calling terminal, an initial address message including the dialed number information. In this instance, the initial address message may be a message that is based on No. 7 protocol.

In operation S702, the call processing apparatus may detect routing number information of the called terminal from a number portability database based on the dialed number information. Specifically, the call processing apparatus may determine whether the called terminal is a terminal using a number portability based on the dialed number information. When the called terminal is determined as the terminal using the number portability, the call processing apparatus may detect the routing number information of the called terminal corresponding to the dialed number information from the number portability database. In this instance, in order to determine whether the called terminal is the terminal using the number portability, the call processing apparatus may perform matching between the dialed number information and information associated with the terminal using the number portability included in the number portability database.

In operation S703, the call processing apparatus may transmit an initial address message 811 to a recipient network server associated with the called terminal based on at least one of the dialed number information and the routing number information. The initial address message 811 may include the dialed number information and the routing number information. Also, in FIG. 8, "DN" may denote the dialed number information and "RN" may denote the routing number information. Also, the donor network server or the recipient network server may be a serer that is connected by No. 7 protocol. The initial address message 811 may be a message that is based on No. 7 protocol.

In operation S704, the call processing apparatus may perform call setup to the recipient network server according to transmission/reception of a message corresponding to the initial address message 811. Specifically, prior to routing a call, the call processing apparatus may refer to a number portability database for the routing number information of the called terminal and then directly perform routing to the recipient network regardless of a donor network, based on at least one of the dialed number information and the routing number information, and perform call setup to the recipient network server based on the routing.

The call processing example 810 may be an example of processing a number portability call between a VoIP network using a wireless device such as WiBro and the like, and any one of the VoIP network using the wireless device, a wired VoIP network, a wired phone network, and a mobile phone network. In the call processing example 810, the recipient network may be the VoIP network using the wireless device, the wired VoIP network, the wired phone network, or the mobile phone network. The initial address message 811 may be, for example, IAM. Also, any one of the call processing apparatus, the originating network server, and the recipient network server may be an electronic communication network system, a switchboard, or a soft switch.

Figure 8B:
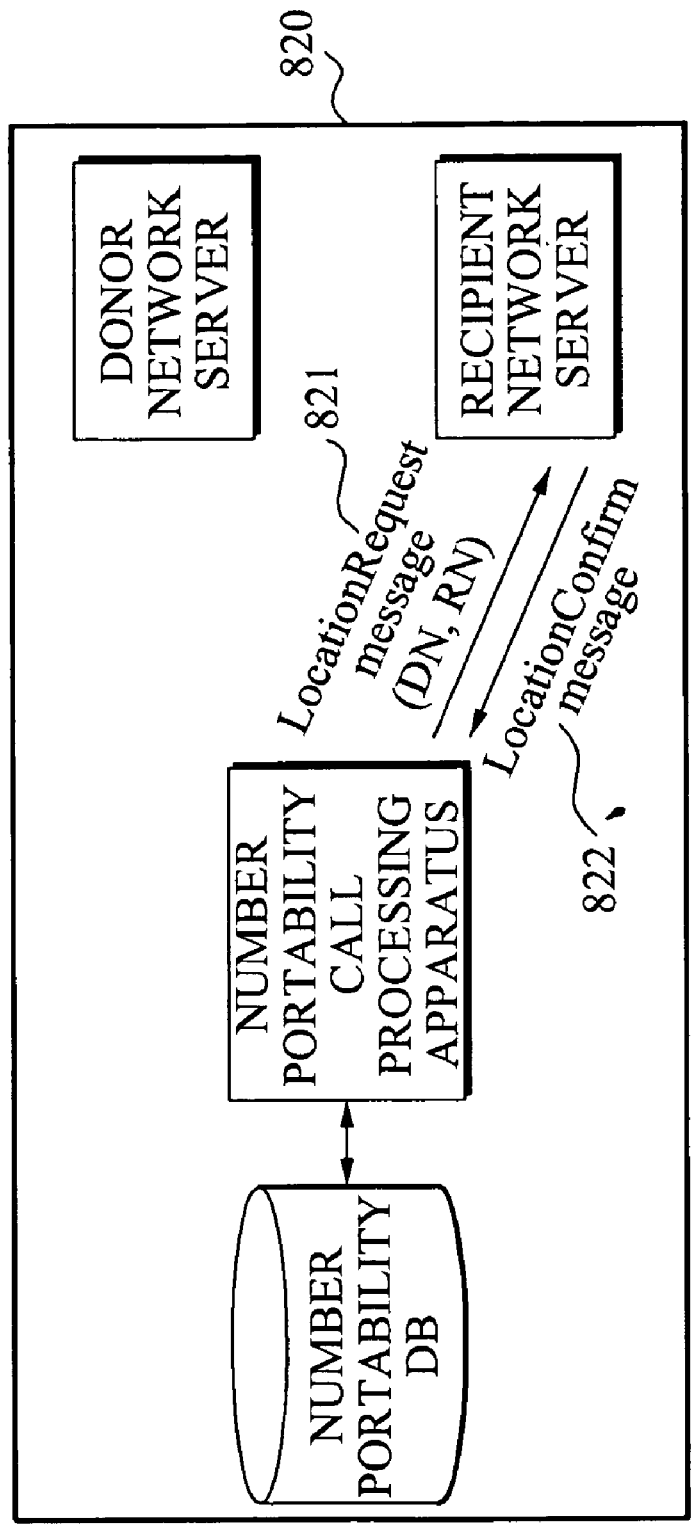
Figure 8C:
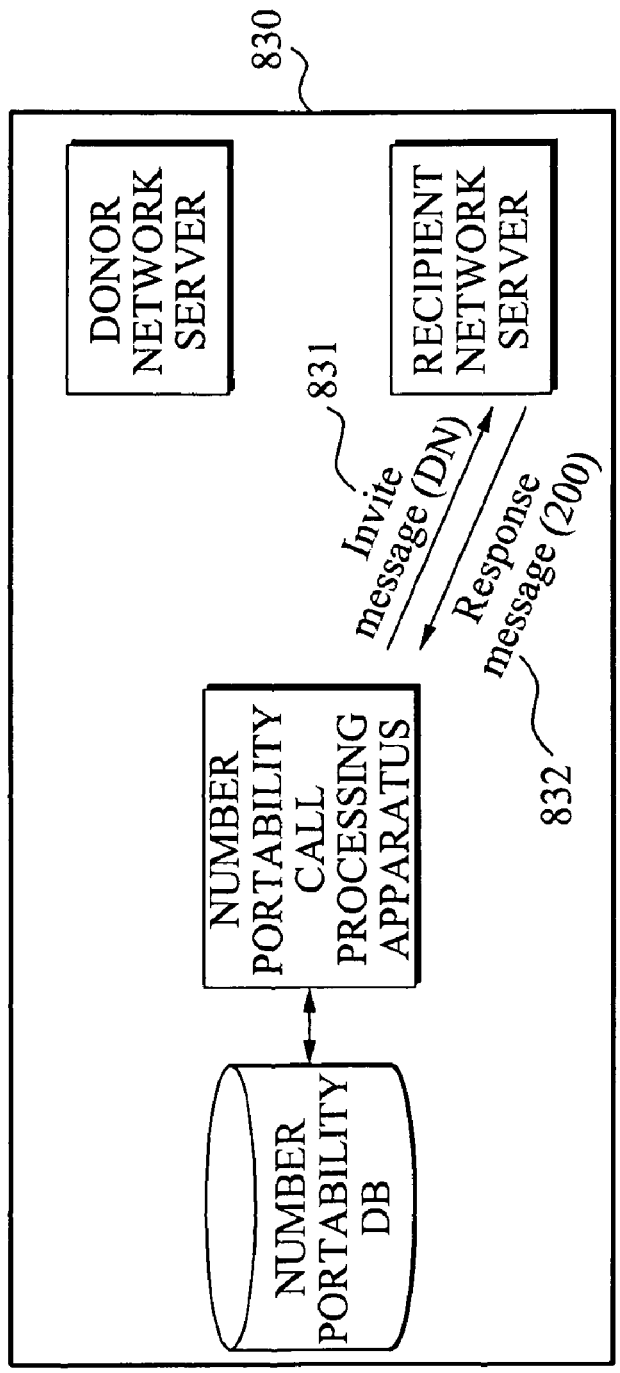

According to another aspect of the present invention, referring to FIG. 7 and a call processing example 820 of FIG. 8B, the call processing apparatus may receive, from a calling terminal, dialed number information associated with a donor network of a called terminal in operation S701. The call processing apparatus may receive, from the calling terminal, a LocationRequest message including the dialed number information. The LocationRequest message may be a message that is based on H.323 protocol.

In operation S702, the call processing apparatus may detect routing number information of the called terminal from a number portability database based on the dialed number information. Specifically, the call processing apparatus may maintain a number portability database including the routing number information and determine whether the called terminal is a terminal using a number portability based on the dialed number information. When the called terminal is determined as the terminal using the number portability, the call processing apparatus may detect the routing number information of the called terminal corresponding to the dialed number information from the number portability database. In this instance, in order to determine whether the called terminal is the terminal using the number portability, the call processing apparatus may perform matching between the dialed number information and information associated with the terminal using the number portability included in the number portability database.

In operation S703, the call processing apparatus may transmit a LocationRequest message 821 to a recipient network server associated with the called terminal based on at least one of the dialed number information and the routing number information. The LocationRequest message 821 may include the dialed number information and the routing number information. Also, in FIG. 8, "DN" may denote the dialed number information and "RN" may denote the routing number information. Also, the originating network server or the recipient network server may be a server that is connected by H.323 protocol. The Location Request message 821 may be a message that is based on H.323 protocol.

In operation S704, the call processing apparatus may perform call setup to the recipient network server according to transmission/reception of a message corresponding to the LocationRequest message 821. Specifically, when a LocationConfirm message 822 is received from the recipient network server in correspondence to the LocationRequest message 821, the call processing apparatus may perform call setup to the recipient network server. Specifically, prior to routing a call, the call processing apparatus may refer to a number portability database for the routing number information of the called terminal and then directly perform routing to the recipient network regardless of a donor network, based on at least one of the dialed number information and the routing number information, and perform call setup to the recipient network based on the routing.

The call processing example 820 may be an example of processing a number portability call between a VoIP network using a wireless device such as WiBro and the like, and any one of the VoIP network using the wireless device, a wired VoIP network, a wired phone network, and a mobile phone network. In the call processing example 820, the recipient network may be the VoIP network using the wireless device, the wired VoIP network, the wired phone network, or the mobile phone network. The LocationRequest message 821 may be, for example, LocationRequest and the LocationConfirm message 822 may be, for example, LocationConfirm. Also, any one of the call processing apparatus, the donor network server, and the recipient network server may be an electronic communication network system, a switchboard, or a soft switch.

According to still another aspect of the present invention, referring to FIG. 7 and a call processing example 830 of FIG. 8 C, the call processing apparatus may receive, from a calling terminal, dialed number information associated with a donor network of a called terminal in operation S701. The call processing apparatus may receive, from the calling terminal, an invite message including the dialed number information. The invite message may be a message that is based on SIP.

In operation S702, the call processing apparatus may detect routing number information of the called terminal from a number portability database based on the dialed number information. Specifically, the call processing apparatus may maintain a number portability database including the routing number information and determine whether the called terminal is a terminal using a number portability based on the dialed number information. When the called terminal is determined as the terminal using the number portability, the call processing apparatus may detect the routing number information of the called terminal corresponding to the dialed number information from the number portability database. In this instance, in order to determine whether the called terminal is the terminal using the number portability, the call processing apparatus may perform matching between the dialed number information and information associated with the terminal using the number portability included in the number portability database.

In operation S703, the call processing apparatus may transmit an invite message 831 to a recipient network server associated with the called terminal based on at least one of the dialed number information and the routing number information. The invite message 831 may include the dialed number information and the routing number information. Also, in FIG. 8, "DN" may denote the dialed number information and "RN" may denote the routing number information. Also, the donor network server or the recipient network server may be a serer that is connected by SIP. The invite message 831 may be a message that is based on No. 7 protocol.

In operation S704, the call processing apparatus may perform call setup to the recipient network server according to transmission/reception of a message corresponding to the invite message 831. Specifically, when a response message 832 is received from the recipient network server in correspondence to the invite message 831, the call processing apparatus may perform call setup to the recipient network server. Specifically, prior to routing a call, the call processing apparatus may refer to a number portability database for the routing number information of the called terminal and then directly perform routing for the recipient network regardless of a donor network, based on at least one of the dialed number information and the routing number information and perform call setup to the recipient network server based on the routing. A status code value of the response message 832 may be set to 200.

The call processing example 830 may be an example of processing a number portability call between a VoIP network using a wireless device such as WiBro and the like, and any one of the VoIP network using the wireless device, a wired VoIP network, a wired phone network, and a mobile phone network. In the call processing example 830, the recipient network may be the VoIP network using the wireless device, the wired VoIP network, the wired phone network, or the mobile phone network. Also, any one of the call processing apparatus, the originating network server, or the recipient network server may be an electronic communication network system, a switchboard, or a soft switch.

As described above, according to the present invention, there may be provided a method of processing an Internet phone number portability call that can flexibly determine a call connection message according to an interworking protocol and thereby provide an effective call processing scheme between different communication networks.

Also, according to the present invention, there may be provided a method of processing a number portability call with respect to a data call and a voice call with any one of communication networks including a VoIP using a wireless device such as a wireless WiBro, a wired VoIP, a wired phone, and a mobile phone.

Also, according to the present invention, there may be provided a method of processing an Internet phone number portability call that can provide various types of interworking schemes such as QoR, RCF, ACQ, and the like, and thereby select an optimal interworking scheme according to a communication network state.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of processing a number portability call, the method comprising:
  transmitting a call request message to a donor network server based on dialed number information of a called terminal;
  receiving a response message according to number portability of the called terminal from the donor network server, in correspondence to the call request message;
  detecting routing number information of the called terminal based on the dialed number information, according to reception of the response message; and
  performing call setup to a recipient network server associated with the called terminal based on at least one of the dialed number information and the routing number information,
  wherein:
  the call request message is an initial address message and the response message is a call release message, and
  the detecting of the routing number information comprises:
  maintaining a number portability database including routing number information; and
  detecting, from the number portability database, the routing number information of the called terminal corresponding to the dialed number information, when the called terminal is determined as a terminal using a number portability based on the call release message,
  wherein:
  the donor network server or the recipient network server is a server that is connected by No. 7 protocol,
  the initial address message or the call release message is a message that is based on No. 7 protocol,
  the call release message is a message in which the donor network server sets at least one of a cause value and a diagnostic value of the call release message according to a number portability of the called terminal, and
  the determination using the call release message determines whether the called terminal is the terminal using the number portability based on at least one of the cause value and the diagnostic value of the call release message.

2. The method of claim 1, wherein the performing of the call setup comprises:
  transmitting, to the recipient network server, the initial address message including the dialed number information or the routing number information; and
  performing the call setup to the recipient network server according to transmission/reception of a message corresponding to the transmitted initial address message.

3. The method of claim 1, wherein:
  the call request message is an invite message, and
  the detecting of the routing number information comprises:
  maintaining a number portability database including routing number information; and
  detecting, from the number portability database, routing number information of the called terminal corresponding to the dial number information when the called terminal is determined as a terminal using a number portability based on the response message.

4. The method of claim 3, wherein:
  the donor network server or the recipient network server is a server that is connected by session initiation protocol (SIP),
  the invite message or the response message is a message that is based on SIP,
  the response message is a message in which the donor network server sets a status code value of the response message according to a number portability of the called terminal, and
  the determination using the response message determines whether the called terminal is determined as the terminal using the number portability based on the status code value of the response message.

5. The method of claim 3, wherein the performing of the call setup comprises:
  transmitting, to the recipient network server, the invite message including the dialed number information or the routing number information; and performing call setup to the recipient network server when the response message, including the status code value for the call setup, is received from the recipient network server.

6. A method of processing a number portability call, the method comprising:
transmitting a call request message to a donor network server based on dialed number information of a called terminal;
receiving a response message according to number portability of the called terminal from the donor network server, in correspondence to the call request message;
detecting routing number information of the called terminal based on the dialed number information, according to reception of the response message; and
performing call setup to a recipient network server associated with the called terminal based on at least one of the dialed number information and the routing number information,
wherein:
the call request message is a LocationRequest message, and the response message is a LocationReject message, and
the detecting of the routing number information comprises:
maintaining a number portability database including the routing number information; and
detecting, from the number portability database, the routing number information of the called terminal corresponding to the dialed number information, when the called terminal is determined as a terminal using a number portability based on the LocationReject message,
wherein:
the donor network server or the recipient network server is a server that is connected by H.323 protocol,
the LocationRequest message or the LocationReject message is a message that is based on H.323 protocol,
the LocationReject message is a message in which the donor network server sets at least one of a LocationRejectReason field and a nonStandardData field of the LocationReject message to a number portability of the called terminal,
the determination using the LocationReject message determines whether the called terminal is the terminal using the number portability based on at least one of the LocationRejectReason field and the nonStandardData field of the Location Reject message.

7. The method of claim 6 wherein the performing of the call setup comprises:
transmitting, to the recipient network server, the LocationRequest message including the dialed number information or the routing number information; and
performing call setup to the recipient network server when a LocationConfirm message corresponding to the transmitted LocationRequest message is received from the recipient network server.

8. A method of processing a number portability call, the method comprising:
receiving, from an originating network server, a call request message including dialed number information of a called terminal;
setting a response message according to a number portability of the called terminal, when the called terminal is determined as a terminal using a number portability based on the dialed number information; and
transmitting the response message to the originating network server,
wherein:
the originating network server detects routing number information of the called terminal based on the dialed number information according to reception of the response message, and
the originating network server performs call setup to a recipient network server associated with the called terminal, based on at least one of the dialed number information and the routing number information,
wherein:
when detecting the routing number information of the called number based on the dialed number information according to reception of the response message, the originating network server detects, from a number portability database, the routing number information of the called terminal corresponding to the dialed number information, and
the originating network server is a server that is connected by any one of No. 7 protocol, H.323 protocol, and SIP,
the recipient network server is a server that is connected by any one of No. 7 protocol, H.323 protocol, and SIP, and
the call request message or the response message is a message that is based on any one of No. 7 protocol, H.323 protocol, and SIP.

9. A method of processing a number portability call, the method comprising:
receiving, from an originating network server, a call request message including dialed number information of a called terminal;
detecting parametric number information associated with the dialed number information, when the called terminal is determined as a terminal using a number portability based on the dialed number information;
transmitting the call request message to a recipient network server associated with the called terminal, based on the parametric number information; and
performing call setup between the originating network server and the recipient network server according to transmission/reception of a message corresponding to transmission of the call request message,
wherein:
the call request message is an invite message, and
the performing of the call setup between the originating network server and the recipient network server comprises:
receiving, from the recipient network server, a response message corresponding to the invite message; and
performing call setup between the originating network server and the recipient network server when the received response message is transmitted to the originating network server
wherein:
the originating network server or the recipient network server is a server that is connected by SIP,
the invite message or the response message is a message that is based on SIP, and
the response message includes a status code value for the call setup,
wherein the transmitting of the call request message includes number portability information in a diversion field of the invite message and transmits, to the recipient network server associated with the called terminal, the invite message including number portability information based on the parametric number information.

10. The method of claim 9, wherein:
the originating network server or the recipient network server is a server that is connected by No. 7 protocol, and the call request message is an initial address message that is based on No. 7 protocol.

11. The method of claim 9, wherein:

the call request message is a LocationRequest message, and the performing of the call setup comprises:

performing call setup with the recipient network server based on the parametric number information, when a LocationConfirm message is received from the recipient network server, in correspondence to the LocationRequest message;

performing call setup with the originating network server based on the dialed number information when the received LocationConfirm message is transmitted to the originating network server; and performing call setup between the originating network server and the recipient network server, based on the call setup using the parametric number information and the call setup using the dialed number information.

12. The method of claim 11, wherein:

the originating network server or the recipient network server is a server that is connected by H.323 protocol, and the LocationRequest message or the LocationConfirm message is a message that is based on H.323 protocol.

13. The method of claim 9, wherein:

the originating network server or the recipient network server is a server that is connected by SIP, the invite message or the response message is a message that is based on SIP, and the response message includes a status code value for the call setup.

* * * * *